United States Patent
Dauphin

[19]

[11] Patent Number: 6,106,063
[45] Date of Patent: Aug. 22, 2000

[54] SEAT PLATE FOR A SEAT OF ADJUSTABLE SEAT DEPTH

[75] Inventor: Friedrich-W. Dauphin, Offenhausen, Germany

[73] Assignee: Dauphin Entwicklungs-und Beteiligungs GmbH, Neukirchen, Germany

[21] Appl. No.: 09/406,824

[22] Filed: Sep. 28, 1999

[30] Foreign Application Priority Data

Oct. 1, 1998 [DE] Germany .................. 198 45 265

[51] Int. Cl.[7] ............................................. A47C 3/025
[52] U.S. Cl. ............................ 297/284.11; 297/284.1
[58] Field of Search ........................... 297/284.1, 284.11, 297/311, 452.21

[56] References Cited

U.S. PATENT DOCUMENTS

| | | |
|---|---|---|
| 423,698 | 3/1890 | Plimsoll . |
| 4,324,431 | 4/1982 | Murphy et al. . |
| 4,334,709 | 6/1982 | Akiyama et al. . |
| 4,401,343 | 8/1983 | Schmidt . |
| 4,541,669 | 9/1985 | Goldner . |
| 4,915,447 | 4/1990 | Shovar . |
| 5,380,063 | 1/1995 | Dauphin . |
| 5,713,632 | 2/1998 | Su . |
| 5,716,099 | 2/1998 | McDiarmid . |

FOREIGN PATENT DOCUMENTS

| | | |
|---|---|---|
| 058661 | 3/1994 | European Pat. Off. . |
| 29619775 | 2/1997 | Germany . |

*Primary Examiner*—Milton Nelson, Jr.
*Attorney, Agent, or Firm*—Browdy and Neimark, P.L.L.C.

[57] ABSTRACT

A seat plate for an adjustable depth seat, in particular of an office chair, comprises two partial plates, the distance of which from each other is adjustable and fixable in the direction of seat depth. In particular, the partial plates are joined to each other by a guide and a releasable locking device, adjustment of seat depth thereby being enabled to take place in the substantially horizontal adjusting direction.

9 Claims, 2 Drawing Sheets

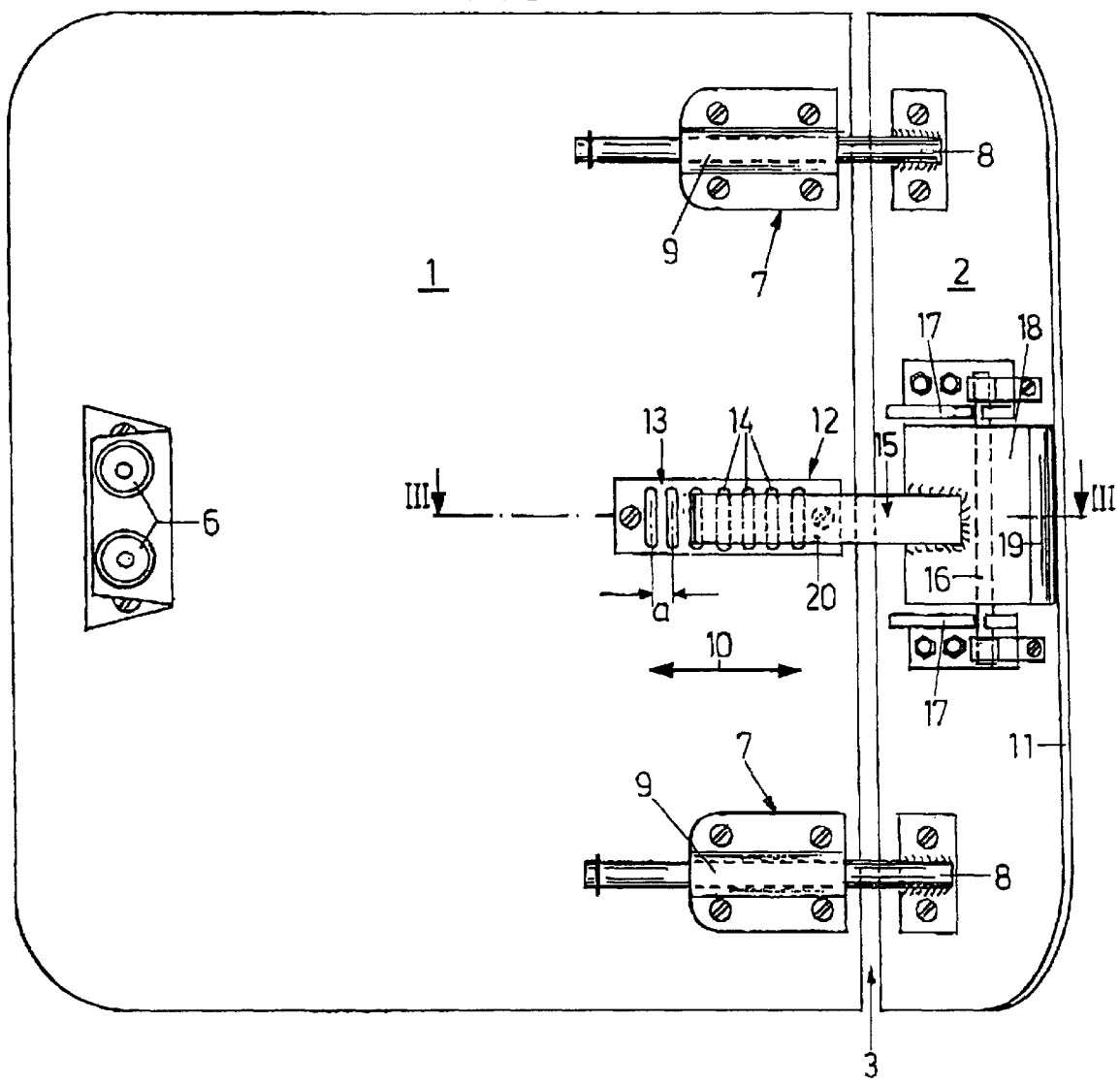
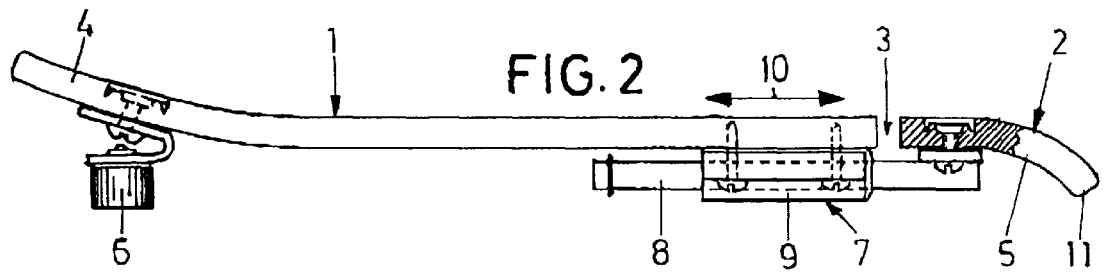

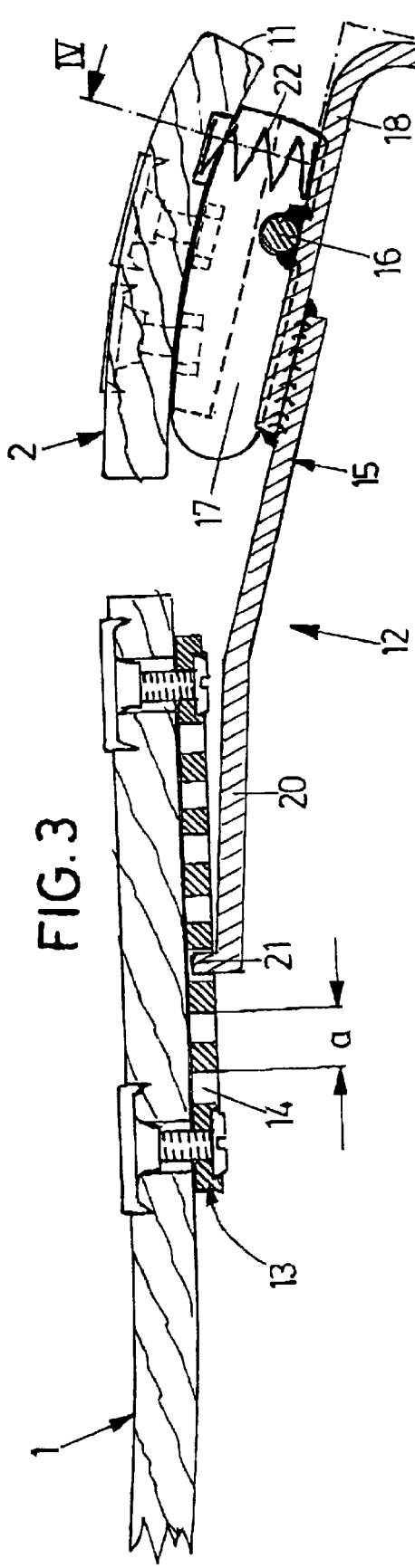
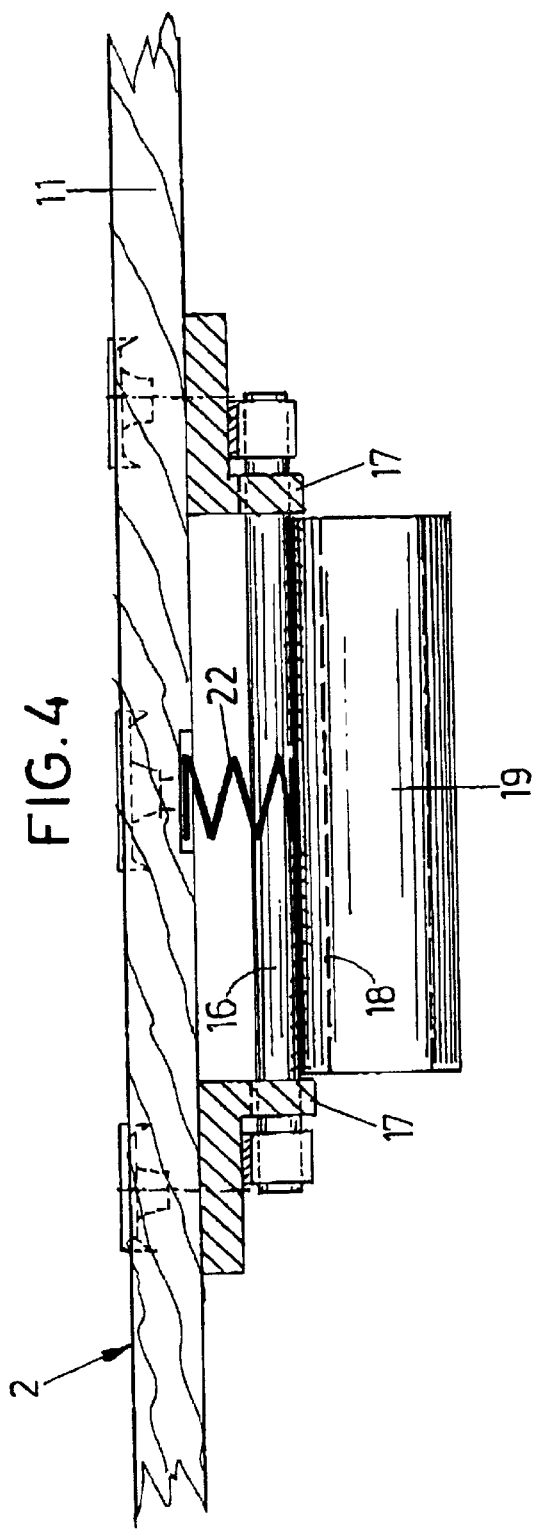

SEAT PLATE FOR A SEAT OF ADJUSTABLE SEAT DEPTH

BACKGROUND OF THE INVENTION

1. Field of the Invention

The invention relates to a seat plate for a seat of adjustable seat depth.

2. Background Art

Adjustable depth seats of the generic type are utilized in particular in office chairs. In known adjustable depth office chairs, depth adjustment is effected via the backrest. The drawback of this is a loss of the ergonomic characteristics in the case of contoured seats. Depending on the depth adjustment of the backrest, the contour of the seat no longer harmonizes with the sitting position of the user. Due to the important differences of body height of the users of these office chairs, seat depth adjustment in the range of at least 50 mm is suggested in practice. This aggravates the mentioned ergonomic problems.

In the case of vehicle seats it is known to modify the seat depth by means of hoses or bellows which are disposed in the vicinity of the front edge of a seat and can be inflated by compressed air. This design proceeds from the assumption that compressed air is available. Moreover, adjustments of seat depth are possible only in a range of far less than 50 mm.

SUMMARY OF THE INVENTION

It is an object of the invention to embody a seat plate of the generic type such that seat depth adjustment within a comparatively important range is feasible by simple means.

According to the invention, this object is attained in a seat plate for an adjustable depth seat which comprises at least a first partial seat plate and a second partial seat plate, the distance of which from each other is adjustable and fixable in the direction of seat depth.

The measures according to the invention ensure that the solid base body of a seat, namely the seat plate itself, is modified by adjustment of the dimensions which define the seat depth. In particular the development according to which the first and second partial plates are constituted by a main seat plate and a front edge seat plate helps ensure that the fuidamental seat contour is maintained with any of these adjustments, i.e. the contour of the seat stays adapted to the seated surface taken by a user. Due to another development according to which the first and second partial plates are adjustable relative to each other in the direction of seat depth adjustment, seat depth adjustment only takes place in the direction in which the seat depth of the seat itself is to be modified.

Further features, advantages and details of the invention will become apparent from the ensuing description of an exemplary embodiment, taken in conjunction with the drawing.

BRIEF DESCRIPTION OF THE DRAWING

FIG. 1 is a view from below of a seat plate;

FIG. 2 is a lateral view, partially broken open, of the seat plate;

FIG. 3 is a vertical partial lengthwise section through the seat plate along the line III—III of FIG. 1; and FIG. 4 is a vertical partial cross-section through the seat plate along the line IV—IV of FIG. 3.

DESCRIPTION OF THE PREFERRED EMBODIMENT

The seat plate seen in the drawing for an adjustable depth seat is subdivided; it comprises a main seat plate 1 and a front edge seat plate 2. Consequently, the entire seat plate is subdivided, forming the main seat plate 1 and the edge seat plate 2. The cleavage 3 is formed in the front seat portion. The entire seat plate constituted by the plates 1, 2 is contoured, i.e. its rear portion 4 is bent slightly upwards and its front portion 5 is bent downwards. On the underside of the rear portion 4, provision is made for a flexible buffer 6 supporting itself on a seat support or a backrest support. The rest of the fastening means for the support or fastening on a seat support of a chair are not illustrated.

The plates 1, 2 are united by means of two guides 7. Each guide 7 comprises for example a guide rod 8 mounted on the edge seat plate 2 and a guide bush 9 also mounted on the underside of the main seat plate 1, the guide rods 8 running parallel to each other and in the adjusting direction 10, i.e. approximately horizontal to the seat depth adjustment. This adjusting direction 10 extends crosswise to the cleavage 3 and the front edge 11 of the edge seat plate 2.

A releasable locking device 12 is also mounted on the underside of the plate 1, serving to fix the edge seat plate 2 at a given distance from the main seat plate 1. This releasable locking device 12 comprises a locking bar 13 which is mounted on the underside of the main seat plate 1, extending in the adjusting direction 10, and which is provided with locking holes 14 which are slightly spaced from each other by a distance a and disposed one after the other in the adjusting direction 10. By means of a pivot axle 16, a locking lever 15 is mounted on the underside of the edge seat plate 2 to be pivotal in a pivot bearing mounted on the underside of the edge seat plate 2. The locking lever 15 is a double-armed lever, the lever arm 18 turned towards the front edge 11 having a handle 19 in the vicinity of the front edge 11 of the edge seat plate 2. The lever arm 20 turned towards the main seat plate 1 reaches under the locking bar 13, its end being provided with an upward latch 21 which matches the shape of the locking hole 14. A prestressed compression spring 22 is disposed between the edge seat plate 2 and the lever arm 18, pressing the lever arm 18 downwards from the edge seat plate 2 and thus pressing the lever arm 20 with the latch 21 upwards against the locking bar 13.

For the distance of the edge seat plate 2 from the main seat plate 1 to be adjusted, the handle 19 is pulled towards the edge seat plate 2, the latch 21 thereby being disengaged from a locking hole 14 of the locking bar 13. Afterwards the handle 19 is operated to move the edge seat plate 2 into a desired position relative to the main seat plate 1 and then the handle 19 is released. The latch 21 locks into place in another locking hole 14 of the locking bar 13, fixing the position of the edge seat plate 2 relative to the main seat plate 1.

The entire seat plate constituted by the main seat plate 1 and the edge seat plate 2 is upholstered and equipped with a suitable covering which is able, by the type of material or upholstery used, to compensate the described modifications in distance between the edge seat plate 2 and the main seat plate 1 and thus the desired adjustment of seat depth. It is also apparent from the foregoing description that the adjustment of seat depth can be performed by the user of a chair while sitting on the chair.

As can be seen from the foregoing, the edge seat plate 2 is displaced relative to the main seat plate 1 approximately on the horizontal line. The releasable locking device can be incorporated in the guide and may be operable for example by means of a Bowden cable. The term "releasable locking" is to be understood not only as a positive but also as a non-positive fit. In particular the non-positive fit can be continuously variable. The number of steps may be selected largely arbitrarily.

What is claimed is:

1. A seat plate for an adjustable depth seat, comprising at least a first and a second partial seat plate (1,2) which are spaced apart a distance from each other, the distance being adjustable and fixable in a direction of seat depth, wherein the first and second partial plates (1,2) are joined to each other by a guide (7) and a releasable locking device (12), and wherein the releasable locking device (12) is formed by a locking bar (13) which is mounted on one of the first and second partial plates (1) and a locking lever (15) which is mounted on one of the second and first partial plates (2) and which can be engaged with, and disengaged from, the locking bar (13).

2. A seat plate according to claim 1, wherein the first and second partial plates are constituted by a main seat plate (1) and a front edge seat plate (2).

3. A seat plate according to claim 1, wherein the first and second partial plates (1, 2) are adjustable relative to each other in a direction (10) of seat depth adjustment.

4. A seat plate according to claim 1, wherein one of the first and second partial seat plates is constituted by an edge seat plate (2) and wherein the releasable locking device (12) comprises a handle (19) in the vicinity of a front edge (11) of the edge seat plate (2).

5. A seat plate according to claim 1, wherein the guide (7) is formed by at least two parallel guide rods (8) which are mounted on one of the first and second partial plates (2) and by guide bushes (9) which are mounted on one of the second and first partial plates (1), housing the guide rods (8).

6. A seat plate according to claim 1, wherein the releasable locking device (12) is disposed on the underside of the first and second partial plates (1, 2).

7. A seat plate according to claim 1, wherein the locking bar (13) is provided with locking holes (14) which are disposed at a distance (a) from each other; and wherein the locking lever (15) has a latch (21) to be engaged with a locking hole (14).

8. A seat plate according to claim 1, wherein the locking lever (15) is forced into a locking position by means of a compression spring (22).

9. A seat plate according to claim 1, wherein the guide (7) is disposed on the underside of the first and second partial plates (1, 2).

* * * * *